(No Model.) 3 Sheets—Sheet 3.

T. F. FLINN.
STEAM ENGINE.

No. 256,831. Patented Apr. 25, 1882.

WITNESSES
Charles R. Searle,
B. E. Stafford.

INVENTOR
Thomas F. Flinn
by his attorney
Thomas D. Stetson

UNITED STATES PATENT OFFICE.

THOMAS F. FLINN, OF FLATBUSH, NEW YORK.

STEAM-ENGINE.

SPECIFICATION forming part of Letters Patent No. 256,831, dated April 25, 1882.

Application filed July 29, 1881. (No model.)

*To all whom it may concern:*

Be it known that I, THOMAS F. FLINN, of Flatbush, Kings county, and State of New York, have invented certain new and useful Improvements relating to Steam-Engines, of which the following is a specification.

The invention applies to reciprocating engines. It is intended more particularly for engines running at high velocities, such as are now largely employed in connection with electric lights and other apparatus requiring steady powers, actively and reliably worked, either constantly or intermittently; but it may be used with some advantage for engines reciprocating at lower velocities.

The accompanying drawings form a part of this specification, and represent what I consider the best means of carrying out the invention as applied to a simple double-acting engine.

Figure 1:
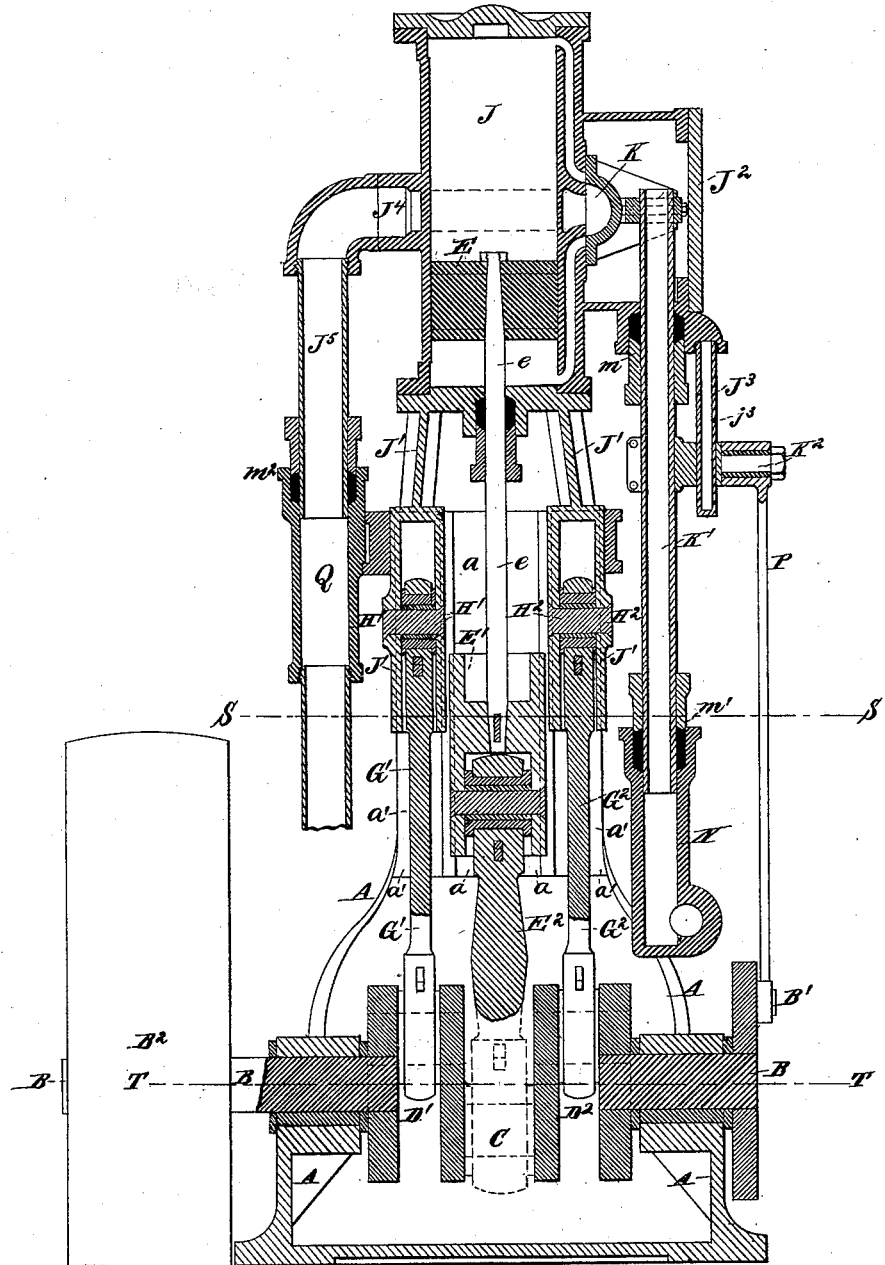
Figure 2:
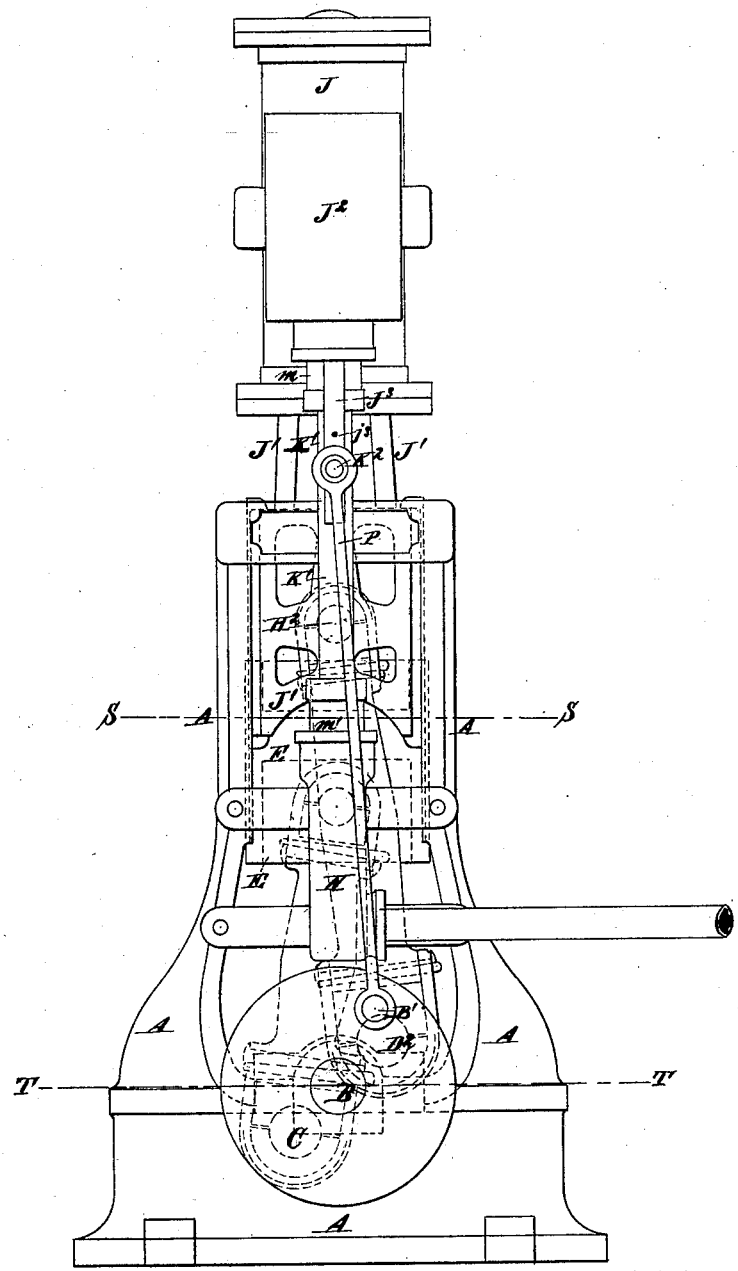
Figure 3:
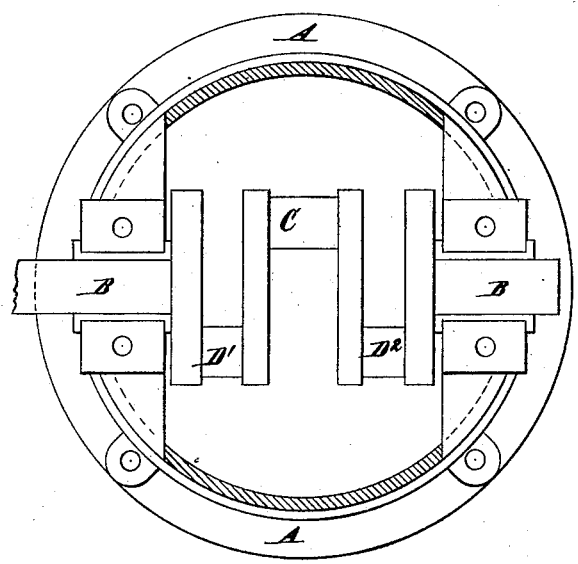
Figure 4:
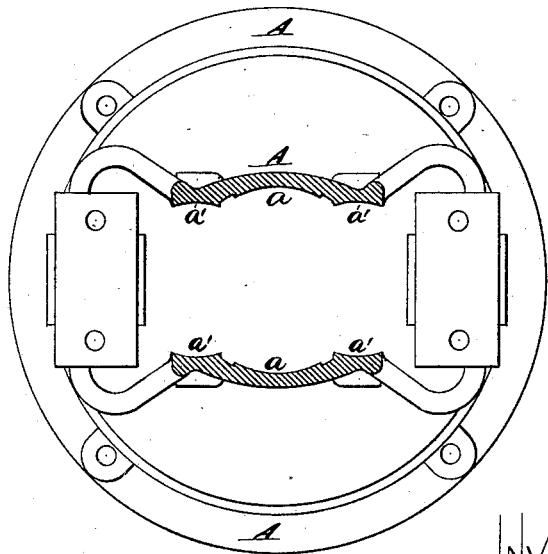

Figure 1 is a vertical section. Fig. 2 is an elevation. Fig. 3 is a horizontal section on the line T T in Figs. 1 and 2 with some of the parts removed. Fig. 4 is a corresponding section on the line S S in Figs. 1 and 2.

Similar letters of reference indicate like parts in all the figures where they occur.

A is a fixed frame-work, of cast-iron or other suitable material.

B is the shaft, mounted in suitable pillow-blocks, between which blocks or bearings it is formed in three distinct cranks. The central crank, C, receives the connecting-rod $E^2$, which unites it in the ordinary manner to a cross-head, $E'$, which latter is connected by a piston-rod, $e$, with a piston, E, working in the cylinder, and subject to the action of the steam in alternate directions. The action of this portion of the apparatus is identical with that in an ordinary steam-engine, except that the throw of the crank and the stroke of the piston, so far as is due to its actual motion, should be less than usual for the same length of cylinder.

The cranks $D'$ and $D^2$ are exactly similar each to the other. They are formed in a single stout iron or steel forging in one with the shaft B and with the crank C, or, if formed in separate pieces, are strongly made and rigidly applied together to serve as a single piece. The pins, so to speak, of these cranks $D'$ $D^2$ are in line with each other. Stout links $G'$ $G^2$ connect them to center pins, $H'$ $H^2$, fitted rigidly in suitable housings in the casting $J'$, which forms the lower head of the cylinder, and extends down a considerable distance, as represented.

J is the cylinder, formed and equipped in the ordinary manner, except as described. The cross-head $E'$ runs in vertical slides or guideways $a$ on the stationary frame-work A. (See Fig. 4.) The bifurcated extension $J'$, rigidly bolted to the cylinder, and forming, in effect, a portion thereof, is fitted to reciprocate in vertical slides or guideways $a'$, formed in the stationary framing A each side of the central guideway, $a$.

I have represented the throw of the cranks as equal, and consequently the extent of the motion of the cylinder is exactly equal to that of the piston. These proportions may be varied. It is intended that the gravity of the parts, or more particularly the momentum and inertia, which depends on the mass or gravity, and also on the extent of the motion, shall balance each other. This is attained by making the cylinder and its attachments as thin as is consistent with strength, and giving extraordinary thickness to the piston and an unusually massive construction to the cross-head $E'$ and to the connecting-rod $E^2$. By this means I give approximately equal weight to the two sets of reciprocating parts, and avoid the shaking motion of the entire machine, which would otherwise result.

The means for operating the valve and for supplying live steam to the cylinder and taking away the exhaust-steam are peculiar.

K is the valve, which may be an ordinary "short D" slide. It is mounted in a steam-chest, $J^2$, which may be of any ordinary or suitable pattern. I attach to the steam-chest $J^2$ a straight tube or hollow casing, $J^3$, closed at the bottom and polished on its exterior. It serves as a pin to guide the mechanism for the valve motion. It also, being hollow, serves as a reservoir of oil to lubricate the bearing-surfaces. This pin $J^3$ has a small hole, $j^3$, through which the oil agitated by the violent reciprocating motion is allowed to exude sufficiently to keep the exterior of the pin and the adjacent surfaces lubricated.

Instead of a slender rod for working the valve K, I use a tube, K', of sufficient capacity to serve as the induction-passage for the steam. It traverses through a stuffing-box, $m$, in the bottom of the steam-chest, and also through another stuffing-box, $m'$, in a casting, N, which forms an extension of the stationary steam-pipe leading to the boiler.

To the pipe K' is rigidly attached a pin, $K^2$, which is guided on the pin $J^2$, before described, and receives a connection, P, from a crank-pin, B', carried on the shaft. It follows that the tube K', and consequently the valve K, is traversed entirely independent of the motion of the cylinder. It can have any extent and time of motion relatively thereto, according as the crank-pin B' is set. I take care to so mount this pin B' on the ample wheel provided that the valve K shall be moved at the right period relatively to the cylinder to give the proper period of opening and closing of the ports. The provision for the exhaust-steam is simpler. An exhaust-nozzle, $J^4$, forming a part of the cylinder receives the exhaust-steam through the throat of the valve K in the ordinary manner and discharges it down a pipe, $J^5$, which is rigidly attached to and forms, in effect, a portion of the cylinder. This tube is nicely polished on its exterior, and plays through a stuffing-box, $m^2$, on a fixed pipe, Q, which is extended to form the exhaust-pipe leading to the smoke-stack, or to any point where it may be desired to exhaust the steam.

$B^2$ is a heavy fly-wheel fixed on the shaft B, and serving to steady the motion thereof, and to carry it past the centers, and also to give motion to a belt, (not represented,) which may work any mechanism required.

Governors, connections for draining off condensed water, attaching indicators, lubricating, and generally all the ordinary or suitable parts required to constitute a complete engine, will be understood as employed in connection with my improvement.

Modifications may be made in many of the details. Parts of the invention may be used without the whole. I can use various fancy devices as additional cut-off valves. Instead of guiding the cylinder by the extension J' alone, the cylinder-body may be provided with arms or slides, which may run in suitable guide-ways in the stationary frame-work A, which may in such case be extended up to any required height. My engine may be worked vertically, horizontally, or variously inclined. It may be used as a stationary engine, marine engine, or a locomotive.

I claim as my invention—

1. In a steam-engine, the reciprocating cylinder J and links G' $G^2$, made thin and light, in combination with the reciprocating piston E, made thick and solid, and with the heavy cross-head E' and heavy connecting-rod $E^2$, and with the triply-cranked shaft B C D' $D^2$, arranged to balance each other, as herein specified.

2. In an engine having a reciprocating piston working in a reciprocating cylinder, the pipe K' and its connections, arranged to perform the double functions of communicating the valve motion and forming a passage for the steam, as herein specified.

In testimony whereof I have hereunto set my hand at New York city this 28th day of July, 1881, in the presence of two subscribing witnesses.

THOMAS F. FLINN.

Witnesses:
CHARLES R. SEARLE,
H. A. JOHNSTONE.